United States Patent

[11] 3,603,795

| [72] | Inventor | Louis A. Allaud<br>Paris, France |
|------|----------|---------|
| [21] | Appl. No. | 772,325 |
| [22] | Filed | Oct. 31, 1968 |
| [45] | Patented | Sept. 7, 1971 |
| [73] | Assignee | Schlumberger Technology Corporation<br>New York, N.Y. |
| [32] | Priority | Dec. 26, 1967 |
| [33] | | France |
| [31] | | 133789 |

[54] METHOD AND DEVICE TO MEASURE THE SPEED OF WATER IN A POLYPHASE FLOW
1 Claim, 1 Drawing Fig.

[52] U.S. Cl. .................................................. 250/83.3,
250/43.5, 250/71.5
[51] Int. Cl. .................................................... G01t 1/16
[50] Field of Search ........................................... 250/71.5,
83.3, 43.5 FC, 43.5 D, 43.5 R

[56] References Cited
UNITED STATES PATENTS

| 3,084,250 | 4/1963 | Dennis | 250/43.5 |
| 3,115,576 | 12/1963 | Rickard | 250/43.5 |
| 3,239,663 | 3/1966 | Oshry et al. | 250/43.5 |

Primary Examiner—James W. Lawrence
Assistant Examiner—Davis L. Willis
Attorneys—William R. Sherman, Donald H. Fidler, Stewart F. Moore and John P. Sinnott ABSTRACT: An illustrative embodiment of the invention measures water speed through oxygen activation. Typically, neutrons of sufficient energy to initiate $O^{16}(n,p)N^{16}$ reactions irradiate a fluid stream, as for example, the usual polyphase stream of fluids flowing through the borehole of a producing oil well. Two gamma ray detectors spaced at different distances from each other downstream from the neutron source register the 6 mev. gamma radiation that characterizes $N^{16}$ disintegration. The water speed then is determined through the ratio of the counts registered by the two detectors.

PATENTED SEP 7 1971 3,603,795
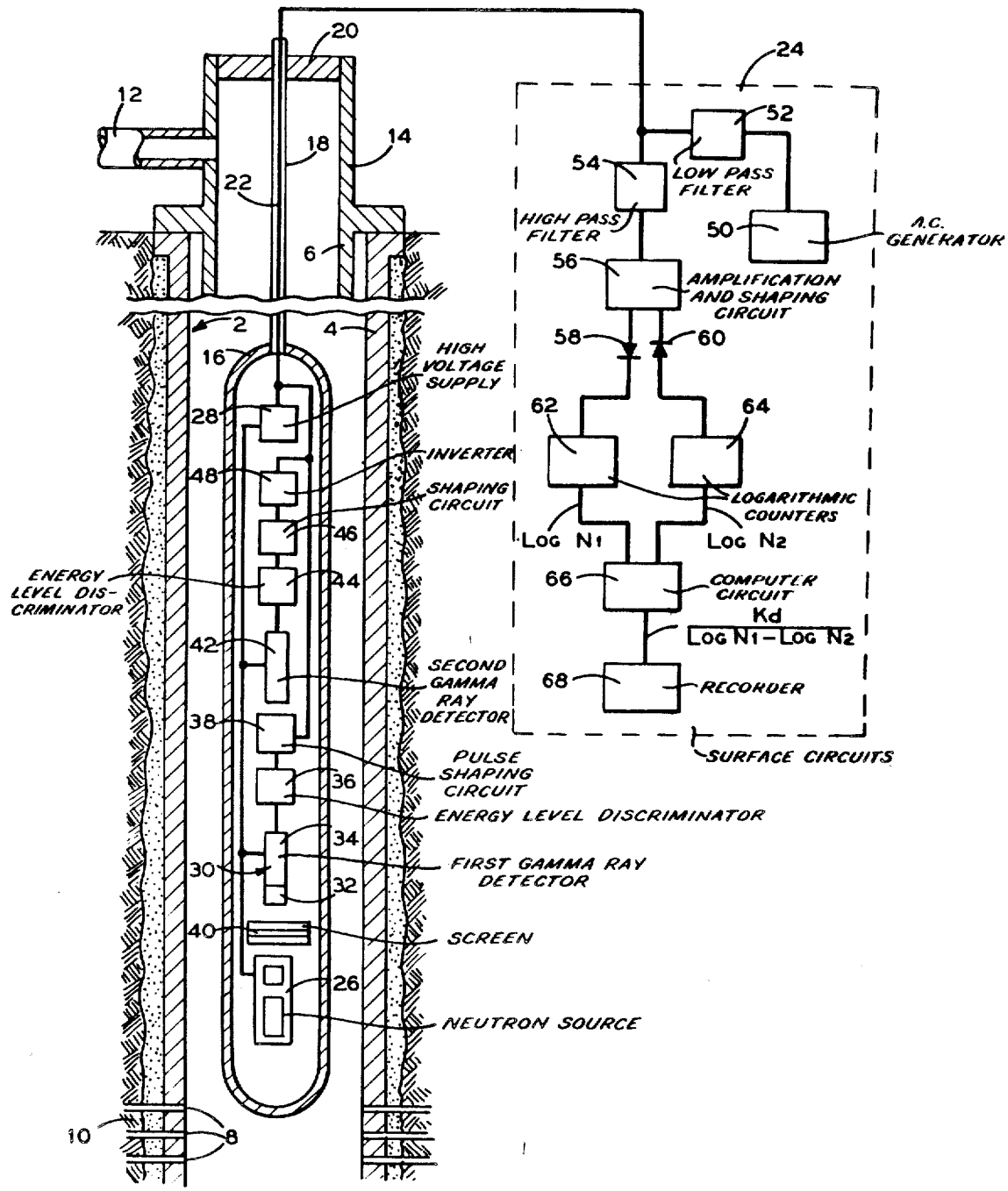

METHOD AND DEVICE TO MEASURE THE SPEED OF WATER IN A POLYPHASE FLOW

This invention concerns a method and a device to meter the speed of the water phase in a polyphase flow, more particularly for the study of productive oil wells.

In productive wells, it is most important to know the quantity and nature of fluids produced by the various zones exploited. This information, in actual fact, makes it possible to follow the development of production and to take all necessary measures to obtain optimum production. In order to obtain this information, the composition and speed of fluids produced is measured throughout the depth of the well. The problem is generally complex by reason of the fact that the flow is polyphase, the various water, gas or oil phases generally flowing at different speeds. For this reason, the dynamic proportions of each component in the flow are different from the static proportions.

The static proportions can easily be obtained, for example, by measuring the density. To obtain the dynamic proportions, additional metering of the average flow is generally conducted. It is then possible to deduce, from this, the dynamic proportions and the speeds of each phase. In actual fact, this average speed is difficult to obtain by conventional methods such as spinner flow meters. Such units give a valid result only if the slippage speed between phases is low compared to the average speed which is the case if the latter is sufficiently high. It is, of course, possible to artificially increase this average speed by reducing the passage section by means of a packer but this solution has the grave disadvantage of increasing the mechanical complexity of equipment and introducing a modification in the well production rate.

Another solution consists in measuring the flow of the phases. Various units have been proposed, in which the general principle is to obtain selective marking of an element contained in a single phase and to calculate the time taken by this compound to move between the marking device and a detector. Such a magnetic resonance selective marking unit is described in French Pat. No: 1,309,940, granted to J. Loeb on Oct. 15, 1962 and assigned to Societe de Prospection Electrique Schlumberger. The main disadvantage of these units is that they must measure travel times. Such a measurement is, in actual fact, difficult since the detection of the instant of passage of the section of marked fluid is difficult to determine by reason of the fact that the speed is not uniform throughout the section of the vein. Furthermore, calculation of the travel time requires complicated electronic circuits.

The purpose of the invention concerns a method to measured the speed of a phase in a polyphase flow which does not require direct measurement of the travel time.

To obtain this result, the radioactive properties of substance irradiated by neutrons are used. It is known that if a substance is irradiated by high energy neutrons (greater than 11 mev), a certain number of nuclear reactions takes place between these neutrons and the nuclei of the elements forming this substance. In particular, the oxygen nuclei are transmuted into isotope $N^{16}$ by the reaction $O^{16}(n,p)N^{16}$. The half-life of this isotope, that is to say the time required for its radioactive power to be reduced by half, is equal to 7.35 seconds, its disintegration generating gamma rays the energy of which is 6.13 mev, which is much more than that of the gamma rays emitted by other disintegrations. It is, therefore, possible to select these gamma rays with an energy level or pulse height discriminator and, consequently, to measure the decrease of isotope $N^{16}$ nuclei. Thus, selective marking of oxygen nuclei is available.

In the case of a productive well which produces water and petroleum products, the study of oxygen elements is equivalent to the study of the water, which is the only fluid containing this element.

The purpose of the invention concerns a method giving the speed of the water as a result of he study of the decrease in radioactivity of isotopes $N^{16}$ obtained by the transmutation of the oxygen.

The purpose of the invention concerns, furthermore a device to measure the waterflow in productive wells in which the electronic circuits are particularly simple.

According to the invention, a method for measuring the speed of the water phase in a polyphase flow is characterized by the fact that it consists in irradiating the flowing fluid with high energy neutrons so as to transmute the oxygen in the water phase into isotope $N^{16}$, in metering at a first and a second point located downstream of the irradiation, the number of high energy gamma rays emitted by the irradiated fluid, these numbers of gamma rays being a function of the quantity of nuclei $N^{16}$ in the vicinity of the first and the second said points and to generate and record an electrical signal as a function of the ratio between these two numbers, the electrical signal being representative of the speed of the water phase.

With this method, the recorded signal is simply obtained by a ratio between the counting rate and does not require measurement of travel time.

In actual fact, as has been previously seen, the oxygen atoms are transmuted into $N^{16}$ under the effect of the high energy neutrons. At the end of a period $T_1$ after irradiation, the number of gamma rays $N_1$ emitted by a given volume of water, is a linear function of the number of atoms of $N^{16}$ still existing in this volume of water and is given by the following equation:

$$N_1 = Ae^{-Kt_1} \quad (1)$$

$K$ and $A$ being constants and $e$ the natural logarithm base. After a period $t_2$, the following will also be obtained:

$$N_2 = Ae^{-Kt_2} \quad (2)$$

The following can be drawn from equations (1) and (2):

$$N_2 = N_1 e^{iK((t_2 - t_1))} \quad (3)$$

If, on two detectors, numbers $N_1$ and $N_2$ of the high energy gamma rays emitted by a fluid taking a time $t$ to move between these two detectors are measured, the following will be obtained:

$$N_1 = N_2 e^{iKt} \quad (4)$$

that is to say:

$$t = (1/K) \text{Log}(N_1/N_2) \quad (5)$$

$K$ being a constant equal to 0.0942.

If the distance between the detectors is equal to $d$, the passage speed of the water is given by the following equation:

$$V_w = d/t = Kd/\text{Log }N_1 - \text{Log }N_2 \quad (6)$$

To obtain this speed $V_w$, it suffices, therefore, to measure the number of gamma rays emitted on these two detectors and to combine these two measurements to solve equation (6). Another advantage of the invention is due to the the fact that the metering of gamma rays gives a statistical measurement of the number of $N^{16}$ nuclei still in the active state in the vicinity of detectors so that the signal $V_w$ represents the average value of the speed of the water.

The characteristics and the advantages of the invention will be further enhanced by the description to follow which is given as a nonlimitative example with reference to the attached drawing in which:

The drawing is a view of the unit in accordance with the invention for studying productive wells and in which the electronic circuits are illustrated diagrammatically.

With reference to the drawing, a well 2 generally lined with cemented casing 4 is equipped with a production tubing 6. Perforations 8 pass through the casing and the cement opposite a certain number of producing zones 10. The fluids produced flow along the well and emerge through a pipe 12 mounted on a production head 14 mounted at the top of tubing 6.

A sealing pressure resistant housing 16 is suspended in the well 2 by an armored cable 18 which is spooled on a winch (not shown) so as to move the unit along well 2. A stuffing box 20 assures tightness around cable 18 whilst allowing it to move. This cable 18 contains at least one insulated conductor 22 which connects the bottom components located within the housing 16 to surface electronic circuits 24.

Housing 16 contains a neutron source 26 which emits high energy neutron pulses. This source 26 can include a deuterium ion source, an accelerator and a tritium target so as to produce approximately 14 mev neutrons. Such a source is described in greater detail in French Pat. No. 1,097,616, granted to Clark Goodman on Feb. 23, 1955 and assigned to Schlumberger Technology Corporation. Source 26 is connected to a high voltage power supply 28, itself connected to surface circuits 24 by means of a conductor.

Housing 16 also contains a first gamma ray detector 30 placed at a distance from source 26. This detector 30 can be of scintillation-type consisting of a crystal 32 optically connected to a photomultiplier 34. The output of this detector, in which the voltage is supplied by power supply 28, is connected to an energy level discriminator 36, itself connected to pulse shaping circuit 38. A discriminator 36 eliminates all the pulses corresponding to low energy gamma rays, for example, with an energy of less than 4 mev. Only the pulses corresponding to high energy gamma rays are, therefore, shaped in circuit 38 then applied by means of conductor 22 of cable 18 to surface circuits 24. Detector 30 is separated from the neutron source 26 by a suitable screen 40 consisting, for example, of juxtapositioned lead, boron and paraffin layers so as to prevent any direct effect between the source and the detector.

A second gamma ray detector 42, which may be identical to the first detector 30, is located above the latter. These two detectors 30 and 42, in which the output pulses have an amplitude proportional to the gamma rays received, may be carefully calibrated in such a manner as to have exactly the same response. The distance between the two detectors 30 exactly the 42 is selected for the ratio between the numbers of pulses to be easily measurable with allowances made for the fact that the radioactivity levels must be sufficient to avoid too great statistical variations. As a practical example, a distance between detectors of the order of 20 cm. is suitable for wells with an average water flow, that is to say in which the water flows at a speed of a few centimeters per second. It is also possible to design a unit with three detectors, for example, in which it is possible to select the spacing between detectors to match various orders of magnitude of flows.

The output pulses from detector 42 are successively applied to an energy level discriminator 44, to a shaping circuit 46, then to an inverter 48 giving negative pulses. The output of inverter 48 is connected to conductor 22 of cable 18. This conductor 22 has, therefore, the triple function of delivering positive pulses originating from detector 30 to the surface, negative pulses originating from detector 42, and of transmitting the power required for the downhole equipment.

Transmission of the pulses to the surface can also be conducted by other conventional means: frequency, amplitude modulation or by pulse code modulation, for example. The circuits then include, furthermore, modulator (not shown) in the housing 16 and a demodulator (also not shown) at the surface.

With further reference to the figure the surface circuits 24 include an AC current generator 50 connected by means of a low-pass filter 52 to conductor 22 of cable 18. This generator delivers the power required for the downhole equipment. Conductor 22 is also connected by means of a high pass filter 52, to an amplification and shaping circuit 56 which generates, through a diode 58, the positive pulses originating from detector 30 and through a second diode 60, the negative pulses from detector 42. The two diodes 58 and 60 are respectively connected to the input of two logarithmic counters 62 and 64, the outputs of which are connected to a computer circuit 66. Each counter generates a signal N proportional to the logarithm of the number of pulses generated by detectors 30 and 42. Computing circuit 66 generates an output signal $V_w$ by combining the output signals from counters 62 and 64 in accordance with equation (6). This signal $V_w$ is then applied to a recorder 68, galvanometric for example, which gives a speed curve for the water as a function of the depth.

Equation (6) can be solved, moreover, by other means. In particular, it is also possible to provide counters giving $N_1$ and $N_2$, and then computing circuits successively giving $N_1/N_2$, Log $(N_1/N_2)$ and $Kd$/Log $(N_1/N_2)$.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A logging tool for insertion within a borehole through which fluid is continuously flowing comprising, not more than one continuously emitting neutron source for irradiating said fluid with neutrons of sufficient energy to react with the oxygen nuclei therein, a first detector for producing a signal spaced downstream from said neutron source and responsive to gamma radiation of more than 6 mev emitted from said continuously flowing fluid, a second detector for producing a signal spaced downstream from said neutron source a distance therealong that is greater than said neutron source and said first detector spacing, said second detector being responsive to gamma radiation of more than 6 mev emitted from said continuously flowing fluid, an inverter circuit responsive to one of said detector signals to produce an output signal of a polarity that is different from the signal that is produced from the other of said detectors, conductor means responsive to said detector signal and said different polarity signal to transmit said signals through the borehole, diode means responsive to said transmitted signals for segregating said signals according to their respective polarities, logarithmic circuit means for producing signals that are proportional to the logarithms of said segregated signals, and further circuit means for combining said logarithmic signals to produce an output signal that characterizes at least one parameter of the fluid in the borehole in accordance with the equation $Vw = kd/\log N_1 - \log N_2$ where $V_w$ is the speed of the water in the borehole; $k$ is a constant; $d$ is the distance between said detectors; $N_1$ is the first detector response to said gamma radiation; and $N_2$ is the second detector response to said gamma radiation.